/ Patented Sept. 22, 1953

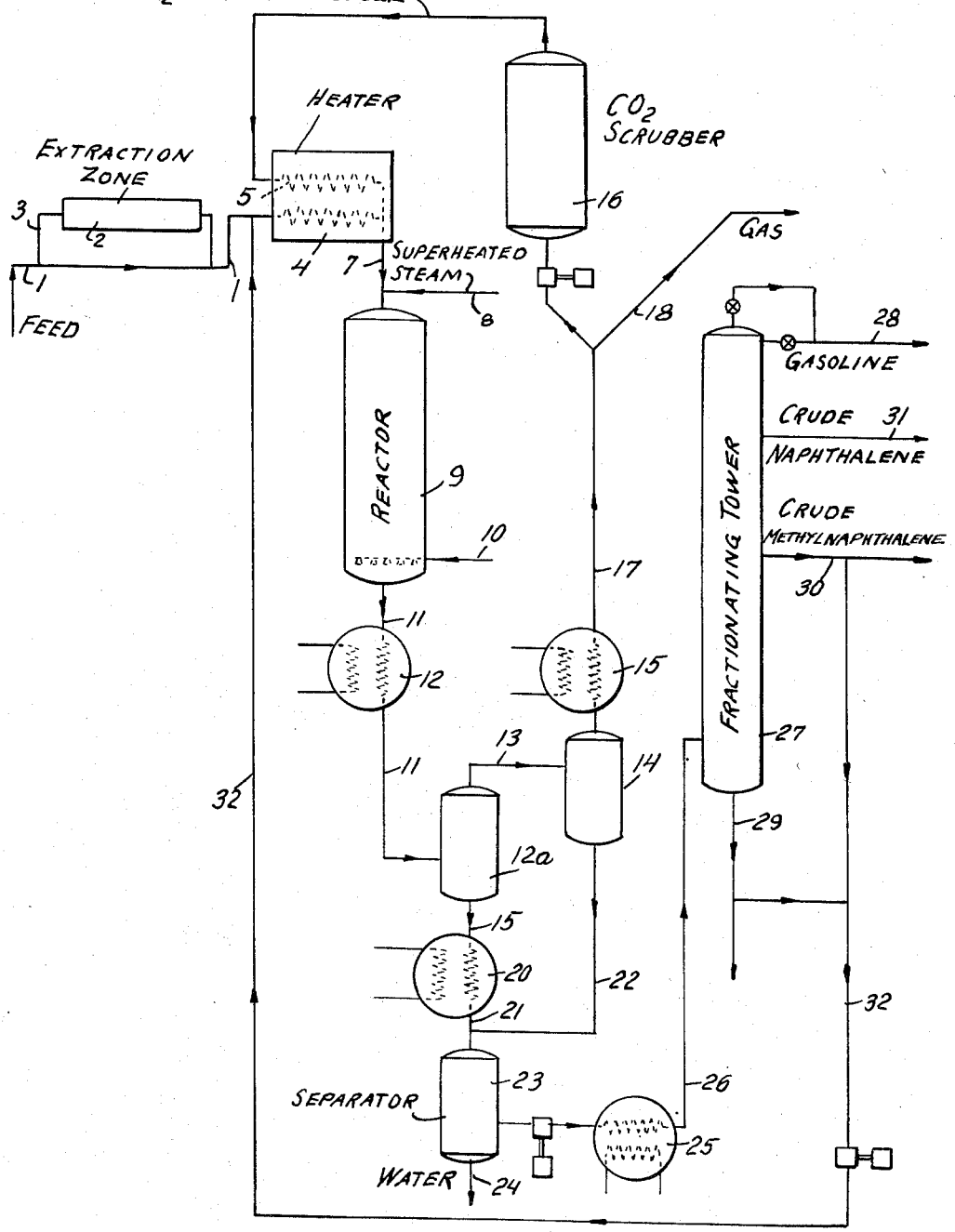

2,653,176

UNITED STATES PATENT OFFICE 2,653,176

PRODUCTION OF AROMATICS FROM PETROLEUM

La Vern H. Beckberger, East Chicago, Ind., assignor to Sinclair Refining Company, New York, N. Y., a corporation of Maine Application May 10, 1950, Serial No. 161,212

6 Claims. (Cl. 260—672)

My invention relates to the production of naphthalene in substantial yields from hydrocarbon fractions rich in alkylated fused-ring aromatics, especially petroleum cycle stocks, by conversion in the presence of a water gas-active, steam insensitive catalyst, hydrogen and steam.

Conventional cracking operations to prepare petroleum products such as gasoline from heavier hydrocarbon fractions is essentially an incomplete process when the total conversion to useful products is considered. In particular, cycle stock, or relatively refractory hydrocarbons boiling in the gas oil range accumulates in vast quantities. As a result, a difficult problem is presented in handling these cycle stocks to further improve the commercial aspects of cracking operations. Continued recycling of such fractions in the system for additional conversion becomes uneconomical because of their general refractory character. On the other hand, as useful products cycle stocks have extremely limited utility. For instance, as heating oils these hydrocarbons have low or negligible values while their ignition quality is too poor for practical use as diesel fuels.

Cycle stocks are characterized by a high content of alkylated fused-ring aromatic compounds, particularly alkylated naphthalenes such as the methyl naphthalenes. Although these materials have limited present market value and cannot be individually separated, naphthalene itself has a definite market value if prepared at low cost.

I have found that naphthalene can be prepared at low cost, efficiently and in substantial yield from hydrocarbon fractions rich in alkylated fused-ring aromatics, particularly cycle stocks from cracking operations, by conversion in the presence of a water gas-active, steam-insensitive catalyst, hydrogen and steam. I have found that reaction conditions are important to the practice of my invention. Essentially, I react the aromatic-rich fraction with hydrogen and steam at a temperature in the range approximating 1200° to 1800° F. The hydrocarbon feed is introduced at a liquid space velocity between about 0.1 to 5.0 volumes per volume of catalyst per hour. The hydrogen and steam is present in the reaction in the amount of about 1 to 20 moles of each for each mole of the hydrocarbon feed, the hydrogen present being calculated as pure $H_2$ and the steam as water. Although the pressure reaction conditions offer considerable latitude, I use pressures from about atmospheric to 100 p. s. i., which are particularly attractive from a commercial and economic aspect. The catalyst employed should be insensitive to steam, have water gas activity, and is one which will promote hydrodealkylation, for instance, a potassium promoted iron oxide-chromia catalyst.

By way of example, I particularly contemplate introducing a cycle stock from a conventional cracking operation, rich in alkylated fused-ring aromatics and boiling in the range 400°-600° F., into a reaction zone into which is also passed substantially pure hydrogen, or a gas containing a large proportion of hydrogen, and superheated steam. Advantageously, the hydrogen is present as a mixture of the fixed or tail gases from the process itself augmented when necessary by the addition of pure hydrogen. The hydrogen gas (considered as pure hydrogen) to hydrocarbon feed molar ratio is preferably between about 4 to 10, while the steam (considered as water) to oil ratio is advantageously in the same range. A steam insensitive, water gas active catalyst is present in the reaction zone, say a potassium promoted iron oxide-chromia catalyst. The reaction is carried out at a temperature of about 1400° F., at a pressure of about 30 to 40 p. s. i. g., with a hydrocarbon feed space velocity between 0.1 to 1.0. The catalyst may be cleaned whenever necessary by passing steam through it when the system is off-stream. The effluent products from the reaction zone are then fractionated to separate the naphthalene and other useful aromatic products, e. g. benzene, toluene and xylenes. Alkylated fused-ring aromatic compounds, such as methyl naphthalenes, and other heavier unconverted fractions boiling above naphthalene removed from the reaction products may be cycled back to the reaction step along with the tail or fixed gases.

Although the process according to my invention is especially adaptable to petroleum cycle stocks, which are readily available at low cost and in considerable quantities, other sources of alkylated fused-ring aromatics may be employed. In general, these cycle oils and other similar fractions contain large proportions of compounds with polycyclic aromatic nuclei attached to which are such groups as methyl, ethyl, propyl (or higher) radicals as well as cycloalkyl, e. g., cyclohexyl, and aryl radicals. In particular, I contemplate using hydrocarbon fractions essentially consisting of alkyl, polyalkyl, aryl or polyaryl naphthalene derivatives or any oil containing these derivatives in appreciable amounts. I especially prefer cycle stocks derived from cracking operations such as those boiling in the range of 400° to 600° F. Coal tar fractions of similar boiling ranges can also be used. However, certain other heavier fractions rich in alkylated fused-ring aromatics such as derivatives of anthracene and phenanthrene are useful. Pure or highly concentrated naphthalene derivatives are not essential since any non-aromatic constituents in the charge will be hydrocracked to lower boiling hydrocarbon liquids and gases from which the naphthalene is removed by distillation. In addition, the presence of non-aromatics and alkylbenzenes in the feed result in the production of benzene, toluene and xylenes, as well as useful hydrocarbon gases, particularly butane. Cycle oils of relatively low aromatic concentration may be initially treated or prepared prior to reaction. For example, solvent extraction with a selective solvent of the nature of furfural or sulfur dioxide will effect separation from non-aromatic constituents present in undesirable amounts.

I have found that the use of a catalyst in my process that is substantially insensitive to steam, that has water gas activity and that promotes hydrodealkylation will substantially improve the yield of naphthalene. The catalyst must be stable in the presence of steam. It must be able to liberate hydrogen from the steam by the water gas reaction and promote hydrodealkylation, while at the same time not catalyzing or promoting, other than to a very limited degree, competing reactions such as cracking and aromatic condensation. Included in this group of catalysts are potassium promoted iron oxide-chromia (e. g. 88% $Fe_2O_3$, 5% $Cr_2O_3$, 7% $K_2CO_3$); nickel-calcium phosphate mixtures promoted with chromia (e. g., 30.5% Ca, 5.1% Ni, 1.3% $Cr_2O_3$); promoted iron-magnesia (e. g., 16 to 19% $Fe_2O_3$, 3.5 to 4.5% CuO, 62 to 75% MgO, 4 to 6% $K_2O$); sodium promoted iron oxide-chromia (e. g., 90% $Fe_2O_3$, 6% $Cr_2O_3$, 4% $Na_2CO_3$); sodium hydroxide promoted activated charcoal (e. g., coconut shell activated carbon impregnated with 3 to 4% NaOH); barium, potassium, or strontium promoted coke or charcoal stabilized with copper oxide, and silica-magnesia promoted with an alkali metal and stabilized with copper oxide. I believe, although my invention is not predicated upon any particular theory, that the sodium, potassium, barium and strontium components, for instance, of these illustrative catalysts serve to promote the water gas reaction while the other constituents of the catalysts apparently promote formation of the naphthalene and other useful compounds as well as improving catalyst life.

I add steam, advantageously superheated, to the reaction mixture undergoing conversion in the amount of at least one mole (considered as water) of steam for each mole of oil feed, to 20 moles of steam per mole of oil. An amount less than one mole is relatively ineffective while quantities in excess of 20 moles are wasteful and do not appreciably improve the reaction. I prefer to add steam in the molar ratio of about 4 to 10. The steam serves, in large measure, to make available in situ hydrogen by the water gas reaction, thereby maintaining catalyst activity by the removal of carbonaceous deposits on the catalyst. The hydrogen so produced is utilized in the dealkylation reaction and prevents excessive tar formation (i. e., less aromatic compound condensation) and also reduces coke formation by preventing cracking of the feedstock to coke and gas.

Although it is not necessary to employ pure hydrogen in my process, I prefer to use hydrogen in the highest concentration that is economically feasible. However, mixtures of hydrogen with other gases or compounds which decompose or react so as to make available hydrogen in situ can be used. I particularly contemplate using, for economic reasons, the non-condensible or tail gases from the effluent products of the reaction which are rich in hydrogen and which may be augmented when necessary by adding substantially pure hydrogen so that hydrogen is maintained in excess during the reaction at all stages of contact. However, steam alone (no free hydrogen at all), although it will be decomposed to make available some hydrogen, is not satisfactory. Diluent gases other than hydrogen, such as nitrogen or propane, are also not satisfactory since their use tends to appreciably lower yields and coke formation. I use about 1 to 20 moles of the hydrogen gas, calculated as pure $H_2$, for each mole of the hydrocarbon feed, and prefer a molar ratio of about 4 to 10. At least one mole of hydrogen is needed to prepare naphthalene in attractive yield, while using hydrogen in amounts above the upper limit is essentially wasteful.

The reaction is carried out at a temperature in the range approximating 1200° to 1800° F. Below the lower limit of 1200° F. the yield of naphthalene is unattractive, while thermal environments exceeding about 1800° F. are difficult to attain and are impracticable because of present day equipment limitations. The pressure conditions may be varied widely, although for economic reasons I prefer relatively low pressures in the range approximating about 0 to 100 p. s. i. g. I have found that reaction temperatures of about 1400 to 1450° F. for a pressure of about 30 to 40 p. s. i. g. are particularly advantageous.

The hydrocarbon feed is introduced into the reaction at a liquid space velocity in the range approximating 0.1 to 5.0 volumes per volume of catalyst per hour. Although it is evident that there is considerable latitude in the rate of oil introduced, at temperatures between about 1200 to 1450° F., the space velocity is preferably below about 1.0.

The effluent products from the hydrodealkylation of the alkylated fused-ring aromatics formed in the process according to my invention are fractionated to yield chiefly naphthalene of good commercial grade. For instance, naphthalene of about 85% purity obtained from a 400°-600° F. boiling range cycle oil is readily marketable, while even redistillation to a premium product of upwards of 90% purity is usually warranted. The effluent from conversions at a 1500° F. or higher temperature usually contains naphthalene in extremely high purity while the effluent from lower temperature reactions may require work up, say by solvent extraction, to prepare a more useful product. Besides naphthalene, other valuable dealkylated aromatics result from the conversion reaction, such as high octane gasoline, which have additional utility.

The following examples are intended to more clearly illustrate my invention.

*Example I*

A hydrocarbon fraction consisting essentially of methylnaphthalenes was introduced into a reactor vessel at the liquid space velocity of 0.39 volume per volume of catalyst per hour. The reaction vessel was packed with a steam-insensitive, water gas-active catalyst material having the following composition by weight:

| | Per cent |
|---|---|
| $Fe_2O_3$ | 88 |
| $Cr_2O_3$ | 5 |
| $K_2CO_3$ | 7 |

A hydrogen-rich gas mixture was introduced into the same reactor containing, for each mole of feed introduced, 4 moles of hydrogen and 10 moles of steam (as water). The mixture was reacted at a temperature reaching a peak of 1400° F. for 4 hours, at 30 p. s. i. g. pressure. The effluent products from the reactor had the following composition by weight as based on the feed:

| | Per cent |
|---|---|
| Liquid | 84.3 |
| Gas | 5.0 |
| Coke | 0.6 |
| Loss | 10.1 |

The analysis of the effluent gases by mole percentage was:

| | Per cent |
|---|---|
| Hydrogen | 88.4 |
| Carbon dioxide | 3.6 |
| Methane | 2.9 |
| Other gases | 5.1 |

The liquid products were distilled into the following fractions by weight:

| | Per cent |
|---|---|
| 440°–460° F | 30.2 |
| 460°–480° F | 46.6 |
| Bottoms | 21.6 |

These liquid products analyzed as follows, by weight on the charge:

| | Per cent |
|---|---|
| Naphthalene | 19.0 |
| Methylnaphthalene | 43.7 |

The ultimate naphthalene yield was 33.8%.

*Example II*

A hydrocarbon fraction consisting essentially of methylnaphthalenes was introduced into a reactor vessel at the liquid space velocity of 0.23 v./v./hr. The reaction vessel was packed with a steam-insensitive water gas-active catalyst material having the following composition by weight:

| | Per cent |
|---|---|
| $Fe_2O_3$ | 88 |
| $Cr_2O_3$ | 5 |
| $K_2CO_3$ | 7 |

A hydrogen-rich gas mixture was introduced into the same reactor containing, for each mole of feed introduced, 4 moles of hydrogen and 10 moles of steam (as water). The mixture was reacted at a temperature reaching a peak of 1400° F. for 4½ hours, at 30 p. s. i. g. pressure. The effluent products from the reactor had the following composition by weight as based on the feed:

| | Per cent |
|---|---|
| Liquid | 91.5 |
| Gas | 7.5 |
| Coke | 1.0 |
| Loss | 0.0 |

The analysis of the effluent gases by mole percentage was:

| | Per cent |
|---|---|
| Hydrogen | 74.9 |
| Carbon monoxide | 7.3 |
| Carbon dioxide | 8.1 |
| Methane | 6.9 |
| Other gases | 2.8 |

The liquid products were distilled into the following fractions by weight:

| | Per cent |
|---|---|
| 400°–460° F | 48.9 |
| 460°–480° F | 30.4 |
| Bottoms | 15.6 |

These liquid products analyzed as follows by weight on the charge:

| | Per cent |
|---|---|
| Naphthalene | 39.5 |
| Methylnaphthalene | 31.1 |

The ultimate naphthalene yield was 57.4%.

*Example III*

A hydrocarbon fraction consisting essentially of methylnapthalene was introduced into a reactor vessel at the liquid space velocity of 0.18 v./v./hr. The reaction vessel was packed as a bed with a steam-insensitive water gas-active catalyst material having the following composition by weight:

| | Per cent |
|---|---|
| $Fe_2O_3$ | 88 |
| $Cr_2O_3$ | 5 |
| $K_2CO_3$ | 7 |

A hydrogen-rich gas mixture was introduced into the same reactor containing, for each mole of feed introduced, 4 moles of hydrogen and 10 moles of steam (as water). The mixture was reacted at a temperature reaching a peak of 1400° F. for 5 hours, at 30 p. s. i. g. pressure. The effluent products from the reactor had the following composition by weight as based on the feed:

| | Per cent |
|---|---|
| Liquid | 85.1 |
| Gas | 13.9 |
| Coke | 0.5 |
| Loss | 0.5 |

The analysis of the effluent gases by mole percentage was:

| | Per cent |
|---|---|
| Hydrogen | 70.0 |
| Carbon monoxide | 7.6 |
| Carbon dioxide | 15.5 |
| Methane | 5.1 |
| Other gases | 1.8 |

The liquid products were distilled into the following fractions by weight:

| | Per cent |
|---|---|
| 400°–460° F | 37.3 |
| 460°–480° F | 49.7 |
| Bottoms | 7.7 |

These liquid products analyzed as follows by weight on the charge:

| | Per cent |
|---|---|
| Naphthalene | 33.2 |
| Methylnaphthalene | 39.1 |

The ultimate naphthalene yield was 54.5%.

*Example IV*

A hydrocarbon fraction consisting essentially of methylnaphthalene was introduced into a reactor vessel at the liquid space velocity of 0.18 v./v./hr. The reaction vessel was packed with a steam-insensitive water gas active catalyst material having the following composition by weight.

| | Per cent |
|---|---|
| $Fe_2O_3$ | 88 |
| $Cr_2O_3$ | 5 |
| $K_2CO_3$ | 7 |

Only steam was introduced into the same reactor at the rate of 10 moles of steam (as water) for each mole of the feed introduced. The mixture was reacted at a temperature reaching a peak of 1400° F. for 5 hours, at atmospheric pressure. The effluent products from the reactor had the following composition by weight as based on the feed:

| | Per cent |
|---|---|
| Liquid | 73.0 |
| Coke | 1.6 |

The liquid products were distilled into the following fractions by weight:

| | Per cent |
|---|---|
| I. B. P.–400° F. | 1.1 |
| 400°–460° F. | 11.0 |
| 460°–480° F. | 7.2 |
| Bottoms | 72.5 |

The liquid products were analyzed and only 3% were recovered as naphthalene, indicating that steam alone is relatively ineffective.

*Example V*

A hydrocarbon fraction having the following analysis:

| | |
|---|---|
| ASTM I. B. P., °F | 452 |
| ASTM E. P., °F | 497 |
| API gravity, ° | 14.7 |
| Olefins, per cent wt | 4.3 |
| Aromatics, per cent wt | 86.7 |
| Naphthalene, per cent wt | 0.7 |
| Methylnaphthalenes, per cent wt | 51.6 | was introduced into a reactor vessel at the liquid space velocity of 0.23 v./v./hr. The reaction vessel was packed with tabular alumina, an inert non-porous solid. A gas mixture of steam and hydrogen was introduced into the same reactor in the molar ratio of 18 moles of steam and 18 moles of hydrogen for each mole of hydrocarbon feed. The mixture was reacted at a temperature reaching a peak of 1350° F. at 30 p. s. i. g. pressure. The reaction products had the following composition by weight as based on the feed:

| | Per cent |
|---|---|
| Gas (C₃—, H₂, C as oxides) | 25.0 |
| Gasoline (410° F.–E. P.) | 3.0 |
| Naphthalene | 7.8 |
| Methylnaphthalene | 15.9 |
| Other liquid products | 47.8 |
| Coke | 0.5 |

The hydrogen consumption was 3110 cubic feet (at S. T. P.) per barrel of feed oil. Thus without the use of a steam-insensitive catalyst with water gas activity the yield of naphthalene was only 7.8%.

*Example VI*

A hydrocarbon fraction having the following analysis:

| | |
|---|---|
| ASTM I. B. P., °F | 452 |
| ASTM E. P., °F | 497 |
| API gravity, ° | 14.7 |
| Olefins, per cent wt | 4.3 |
| Aromatics, per cent wt | 86.7 |
| Methylnaphthalenes, per cent wt | 51.6 |
| Naphthalene, per cent wt | 0.7 | was introduced into a reactor vessel at the liquid space velocity of 0.23 v./v./hr. The reaction vessel was packed with a steam-insensitive, water gas-active catalyst material having the following composition by weight:

| | Per cent |
|---|---|
| Fe₂O₃ | 88 |
| Cr₂O₃ | 5 |
| K₂CO₃ | 7 |

A gas mixture of steam and hydrogen was introduced into the same reactor in the molar ratio of 16 moles of steam and 5 moles of hydrogen for each mole of hydrocarbon feed. The mixture was reacted at a temperature reaching a peak of 1350° F. at 30 p. s. i. g. pressure. The reaction products had the following composition by weight as based on the feed:

| | Per cent |
|---|---|
| Gas (C₃—, H₂, C as oxides) | 32.1 |
| Gasoline (410° F.–E. P.) | 2.6 |
| Naphthalene | 13.2 |
| Methylnaphthalene | 23.1 |
| Other liquid products | 29.0 |

The hydrogen make, considered on a once-through basis, was 5550 cubic feet (at S. T. P.) per barrel of feed oil.

*Example VII*

A hydrocarbon fraction having the following analysis:

| | |
|---|---|
| ASTM I. B. P., °F | 452 |
| ASTM E. P., °F | 497 |
| API gravity, ° | 14.7 |
| Olefins, per cent wt | 4.3 |
| Aromatics, per cent wt | 86.7 |
| Methylnaphthalenes, per cent wt | 51.6 |
| Naphthalene, per cent wt | 0.7 | was introduced into a reactor vessel at the liquid space velocity of 0.20 v./v./hr. The reaction vessel was packed with a steam-insensitive, water gas-active catalyst material having the following composition by weight:

| | Per cent |
|---|---|
| Fe₂O₃ | 90 |
| Cr₂O₃ | 6 |
| Na₂CO₃ | 4 |

A gas mixture of steam and hydrogen was introduced into the same reactor in the molar ratio of 24 moles of steam and 18 moles of hydrogen for each mole of hydrocarbon feed. The mixture was reacted at a temperature reaching a peak of 1350° F. at 40 p. s. i. g. pressure. The reaction products had the following composition by weight based on the feed:

| | Per cent |
|---|---|
| Gas (C₃—, H₂, C as oxides) | 42.0 |
| Gasoline (410° F.–E. P.) | 1.3 |
| Naphthalene | 17.7 |
| Methylnaphthalene | 14.0 |
| Other liquid products | 25.0 |

The hydrogen make, considered on a once-through basis, was 6550 cubic feet per barrel of feed oil. Hence by the use of a steam-insensitive catalyst with water gas activity the naphthalene yield is as high as 17.7 wt. per cent, compared to 7.8 wt. per cent of Example V in which no such catalyst material was used. Furthermore, coke formed during the process is continuously removed by the water-gas reaction and the operation is self-sustaining in hydrogen.

The accompanying drawing is a flow diagram illustrating somewhat schematically a continuous process according to my invention.

A petroleum fraction rich in alkylated fused-ring aromatics, a cycle oil boiling in the range 400°–600° F. from a cracking operation, is introduced by line 1. Extraction zone 2 is provided, accessible by line 3, if it is necessary to improve the quality of the feed oil to be treated by removing non-aromatics with a selective solvent such as furfural or sulfur dioxide. In any event, the feed oil is passed by line 1 through heat zone 4, while the hydrogen gases passing to the reaction are also heated in this zone by passing through line 5. The hydrogen gases comprise substantially the hydrogen-rich tail gases separated from the reaction products. Both the feed oil and hydrogen gases are then heated to an elevated temperature in this heat zone 4, for instance about 500° to 700° F., and mixed together when they are passed by single line 7 to the reaction zone. Superheated steam is added by line 8 to the mixture entering the reaction zone 9. Reaction zone 9 is packed with a catalyst material insensitive to steam and which has water-gas activity. Advantageously, the catalyst is a sodium promoted iron oxide-chromia mixture, for instance, by weight, 90% $Fe_2O_3$, 4% $K_2CO_3$ and 6% $Cr_2O_3$. The reaction is carried out at a temperature in the range approximating 1200° to 1800° F. at a pressure, although considerable latitude is afforded, advantageously in the range of atmospheric to about 100 p. s. i. g. Preferably, the reaction is carried out at a temperature of about 1400° F. at about 30 to 40 p. s. i. g. The hydrogen gas feed, steam and charge oil introduced into the reactor are regulated so that a molar ratio of hydrogen to oil of 1 to 20 and of steam to oil of 1 to 20 exists, calculated as pure hydrogen and as water. The hydrocarbon is fed into the reaction zone at a liquid space velocity of 0.1 to 5.0 volumes per volume of catalyst per hour, advantageously 0.1 to 1.0 when temperatures below 1500° F. are employed. A water quench 10 is provided in the reaction zone so that thermal conditions may be regulated during reaction and for cooling of the hot effluent vapors. The effluent products from the reaction are taken off by line 11 and passed through cooling zone 12, advantageously a waste heat boiler where they are cooled to about 300° to 400° F. The products are then passed through liquid separation zone 12a, a knockout drum, where the non-condensible gases are separated from the liquid by line 13. The fixed or non-condensible gases are then passed by line 13 to a second liquid separation means 14, another knockout drum, where any remaining liquid is removed. The non-condensible or tail gases, rich in hydrogen, are then cooled in cooling zone 15 and passed to carbon dioxide scrubber 16 by line 17. Any amount of the gases may be bled out by line 18. After the $CO_2$ has been removed these gases are recycled back to the reaction as desired. The liquid separated out by the knockout drums passes to water separator 23 by lines 21 and 22, although the liquid from the first drum may be additionally cooled in cooling zone 20 so that it is at a temperature between about 90 to 120° F. The water is then removed from the products by line 24. The liquid is then heated again in heating zone 25 and is introduced into fractionating zone 27 for separation into useful constituents by line 26. From the fractionating zone 27, the gasoline-range boiling constituents are removed as overhead by line 28, tar as bottoms by line 29, a crude methylnaphthalene fraction by line 30 and a crude naphthalene fraction by line 31. The gasoline and naphthalene fractions are passed to storage or may be redistilled for additional purity. Crude methylnaphthalene and the bottoms may be recycled as desired by line 32 to be admixed with the feed stock.

I claim:
1. The method of converting higher molecular weight hydrocarbons fractions rich in alkylated fused-ring aromatic compounds to lower molecular weight hydrocarbons which comprises passing the hydrocarbon fraction into a reaction zone in the presence of a hydrogen-rich gas, steam and a catalyst prepared by combining a major amount of iron oxide with promoting amounts of chromia and a member selected from the group consisting of inorganic, oxygen-containing sodium and potassium compounds which afford their respective oxides under the reaction conditions and which is steam-insensitive, water gas-active and which promotes hydrodealkylation, at a liquid space velocity in the range approximating 0.1 to 5.0 volumes per volume of catalyst per hour, the hydrogen and steam each being present in the reaction in the amount of about 1 to 20 moles of each for each mole of the hydrocarbon fraction, maintaining the reaction zone at a temperature in the range approximating 1200° to 1800° F., and separating the lower molecular weight hydrocarbons from the effluent reaction products.

2. The method according to claim 1 wherein the reaction is carried out at a pressure in the range approximating 0 to 100 p. s. i. g.

3. The method according to claim 1 wherein the hydrogen-rich tail gases are separated from the effluent reaction products and are recycled to the reaction zone.

4. The method according to claim 1 wherein the hydrogen-rich tail gases and hydrocarbons boiling above naphthalene are separated from the effluent reaction products and are recycled to the reaction zone.

5. The method of preparing naphthalene from petroleum cycle stocks rich in alkylated naphthalenes which comprises passing the cycle stock into a reaction zone in the presence of a hydrogen-rich gas, superheated steam and a catalyst prepared by combining a major amount of iron oxide with promoting amounts of chromia and a member selected from the group consisting of inorganic, oxygen-containing sodium and potassium compounds which afford their respective oxides under the reaction conditions and which is steam-insensitive, water gas-active and which promotes hydrodealkylation at a liquid space velocity in the range approximating 0.1 to 5.0 volumes per volume of catalyst per hour, the hydrogen and steam each being present in the reaction in the amount of about 1 to 20 moles of each for each mole of the petroleum fraction, maintaining the reaction zone at a temperature in the range approximating 1200° to 1800° F., separating the tail gases from the effluent reaction products and recycling said gases to the reaction zone, and fractionally distilling the liquid reaction products to separate therefrom naphthalene.

6. The method of preparing naphthalene from alkylated naphthalenes which comprises passing the alkylated naphthalene into a reaction zone in the presence of a hydrogen-rich gas, steam and a catalyst prepared by combining a major amount of iron oxide with promoting amounts of chromia and a member selected from the group consisting of inorganic, oxygen-containing sodium and potassium compounds which afford their respective oxides under the reaction conditions and which is steam insensitive, water gas-active and which promotes hydrodealkylation at a liquid space velocity in the range approximating 0.1 to 5.0 volumes per volume of catalyst per hour, the hydrogen and steam each being present in the reaction in the amount of about 1 to 20 moles of each for each mole of the alkylated naphthalenes, maintaining the reaction zone at a temperature in the range approximating 1200° to 1800° F., separating the tail gases from the effluent reaction products and recycling said gases to the reaction zone, and fractionally distilling the liquid reaction products to separate therefrom naphthalene.

LA VERN H. BECKBERGER.

References Cited in the file of this patent

UNITED STATES PATENTS

| Number | Name | Date |
|---|---|---|
| 1,365,849 | Ramage | Jan. 18, 1921 |
| 2,167,339 | Sweeney | July 25, 1939 |
| 2,194,449 | Sachanen et al. | Mar. 19, 1940 |
| 2,264,427 | Asbury | Dec. 2, 1941 |
| 2,414,585 | Eggersten et al. | Jan. 21, 1947 |
| 2,426,829 | Kearby | Sept. 2, 1947 |
| 2,436,923 | Haensel | Mar. 2, 1948 |